Jan. 2, 1923.
G. GLAUDEL.
WINDSHIELD ATTACHMENT.
FILED NOV. 27, 1920.
1,440,537.
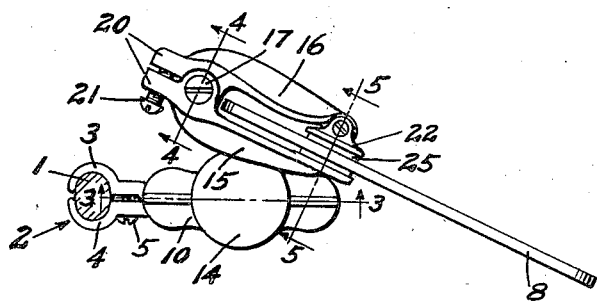
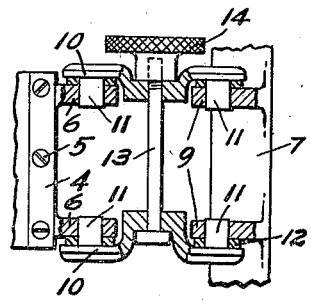
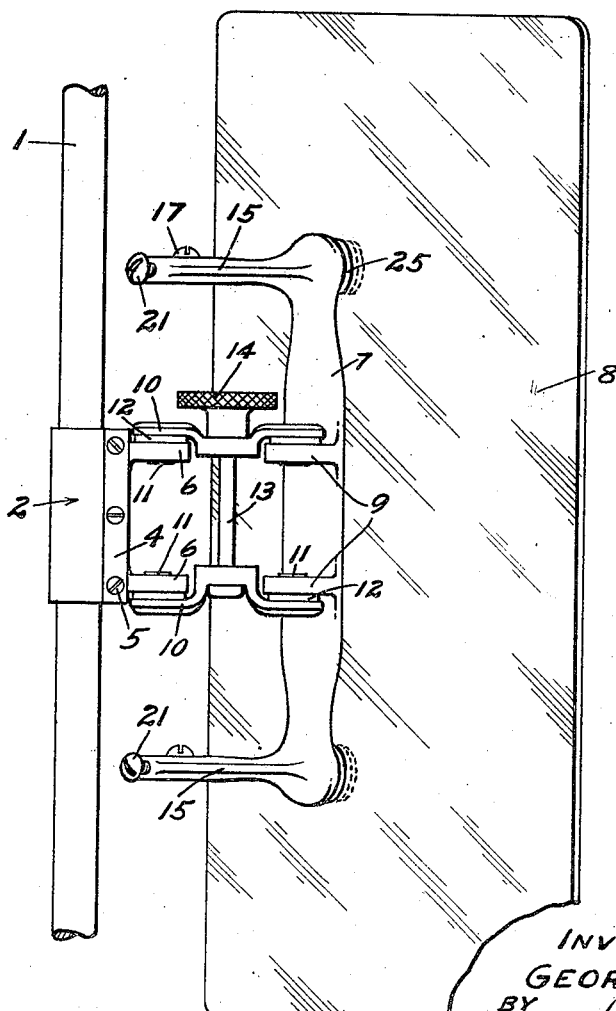
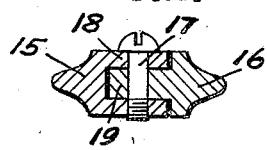
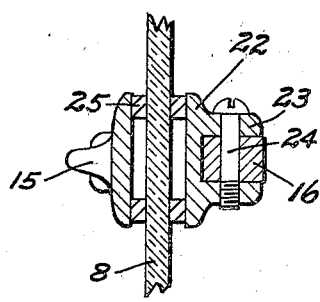
INVENTOR
GEORGE GLAUDEL
BY
ATT'YS Patented Jan. 2, 1923.

1,440,537

UNITED STATES PATENT OFFICE.

GEORGE GLAUDEL, OF LOS ANGELES, CALIFORNIA, ASSIGNOR OF ONE-HALF TO GEORGE L. MITCHELL, OF SANTA MONICA, CALIFORNIA.

WINDSHIELD ATTACHMENT.

Application filed November 27, 1920. Serial No. 426,865.

*To all whom it may concern:*

Be it known that I, GEORGE GLAUDEL, a citizen of the United States, residing at Los Angeles, in the county of Los Angeles and State of California, have invented new and useful Improvements in Windshield Attachments, of which the following is a specification.

It is the object of this invention to provide an improved mounting for a wind deflector adapted to be mounted at the side of a usual windshield.

The invention contemplates the provision of improved means for mounting the plate forming the wind deflector in its supporting bracket, and also provides an improved adjustable mounting for the bracket.

The invention will be readily understood from the following description of the accompanying drawings, in which:

Figure 1 is a plan view of a wind deflector constructed in accordance with the invention.

Fig. 2 is an elevation of the same.
Figs. 3, 4 and 5 are detail sections on the lines 3—3, 4—4 and 5—5 of Fig. 1.

In the drawings I have shown a side bar of an automobile windshield at 1, and the improved support for the wind deflector bracket is mounted upon this side bar.

The support includes a clamping bracket 2 having a detachable clamping arm 3 and a fixed arm 4 connected by screws 5, so that bracket 2 may be clamped upon side bar 1.
The bracket 2 is provided with vertically spaced bearing lugs 6, and the wind deflector bracket which includes a bar 7 received against the deflector plate 8 is provided with similar bearing lugs 9.
Clamping plates 10 cooperate with the respective pairs of lugs 6—9, said clamping plates being provided at their ends with pins 11 adapted to be received in the openings of the bearing lugs. Yieldable washers 12 may be interposed between the bearing lugs and the clamping plates.

The clamping plates are moved into clamping engagement with lugs 6—9 in order to clamp the wind deflector in pivotally adjusted positions. As an instance of this arrangement a bolt 13 is received through the clamping plates 10 with the head of the bolt abutting against one of the plates, and a knurled nut 14 threaded upon the end of the bolt beyond the second clamping plate. By this arrangement tightening of the nut is adapted to clamp the wind deflector bracket in adjusted positions with relation to the windshield.

The bar 7 of the wind deflector bracket extends an appreciable distance along the plate 8, and terminates in arms 15 extending at right angles to the same along side of plate 8 and beyond its side edge. Cooperating arms 16 are pivoted to arms 15 at the end thereof, which extend beyond plate 8, and these latter arms lie along side the opposite surface of plate 8 with their ends opposite the ends of bar 7. Arms 16 are pivoted to arms 15 by screws 17 received through alined lugs 18 of arm 15, and lug 19 of arm 16. The ends of the cooperating arms project beyond their pivotal connection so as to form the lugs 20, and a set screw 21 is threaded through one of these lugs so as to engage the lug of the second arm.

The swinging end of arm 16 and the alined end of bar 7 form clamping surfaces adapted to engage the respective faces of plate 8. For this purpose a clamping plate 22 is pivoted upon the end of arm 16 as by bearing lugs 23 upon said clamping plate being received at opposite sides of the end of the arm, with a pivot screw 24 received through the alined parts. The contact surface of head 22 as well as the contact surface of the end of bar 7, are provided with cushioning rings 25 received against the plate 8.

By the arrangement of the supporting bracket as thus set forth, plate 8 may be readily clamped between arms 15—16, said arms being moved into clamping engagement through said screw 21.

It will thus be seen that I have provided a novel mounting for a side wind deflector in which the deflector plate bracket is readily clamped to the plate, and may also be readily clamped in adjusted positions with relation to the windshield.

Various changes may be made without departing from the spirit of the invention as claimed.

What is claimed is:

1. The combination with a wind deflector, of a supporting bracket having spaced lugs, a clamp adapted to be secured to a windshield frame and having spaced lugs, connecting plates arranged to engage lugs of the respective sets, and a bolt for securing said plates to said lugs.

2. In a windshield attachment, a clamping bracket, a wind deflector plate supporting bracket, including a vertically arranged bar, clamping arms formed on the opposite ends of the bar, bearing lugs formed at corresponding points upon said bar and said clamping bracket, clamping plates between the brackets, pins formed on the plates and rotatably fitted in the bearing lugs, a bolt extending through the plates, and a nut engaging the bolt for drawing the plates toward each other to lock the lugs against movement on the pins.

3. In a windshield attachment, a clamping bracket, a wind deflecting plate supporting bracket, bearing lugs formed at corresponding points on the brackets and arranged in pairs, clamping plates, pins formed on the clamping plates, with the pins of one plate rotatably fitted in the bearing lugs of the corresponding pair, and the pins of one pair being disposed in opposed relation with respect to the pins of the other pair, and adjustable means for moving the plates toward or away from each other whereby the second bracket is locked or released for swinging movement.

In testimony whereof I have signed my name to this specification.

GEORGE GLAUDEL.